US009954860B2

(12) United States Patent
Wood et al.

(10) Patent No.: US 9,954,860 B2
(45) Date of Patent: Apr. 24, 2018

(54) ONLINE SECURE TRANSACTION VERIFICATION SYSTEM PROXY SERVER AND METHOD

(71) Applicant: Entrust, Inc., Dallas, TX (US)

(72) Inventors: Christopher D. Wood, Kanata (CA); Michael Holtstrom, Ottawa (CA); Roland Thomas Lockhart, Kanata (CA); Murray McCulligh, Ottawa (CA); Serge Jean Maurice Mister, Ottawa (CA); Greg Wetmore, Nepean (CA)

(73) Assignee: Entrust, Inc., Dallas, TX (US)

( * ) Notice: Subject to any disclaimer, the term of this patent is extended or adjusted under 35 U.S.C. 154(b) by 0 days.

(21) Appl. No.: 14/208,193

(22) Filed: Mar. 13, 2014

(65) Prior Publication Data

US 2014/0373093 A1 Dec. 18, 2014

Related U.S. Application Data

(60) Provisional application No. 61/789,417, filed on Mar. 15, 2013.

(51) Int. Cl.
*H04L 29/06* (2006.01)
*G06Q 20/42* (2012.01)
*G06Q 20/40* (2012.01)

(52) U.S. Cl.
CPC ..... *H04L 63/0884* (2013.01); *G06Q 20/4014* (2013.01); *G06Q 20/4016* (2013.01); *G06Q 20/425* (2013.01); *H04L 63/08* (2013.01); *H04L 63/105* (2013.01); *H04L 63/14* (2013.01)

(58) Field of Classification Search
CPC ......... H04L 63/08; H04L 63/10; H04L 63/20; H04L 29/06; H04L 63/0884; H04L 63/105; H04L 63/14; G06Q 20/4014; G06Q 20/4016; G06Q 20/425
See application file for complete search history.

(56) References Cited

U.S. PATENT DOCUMENTS

| 8,595,613 B1 * | 11/2013 | Mills | G06F 3/048 |
| | | | 715/234 |
| 2004/0143564 A1 * | 7/2004 | Gross et al. | 707/1 |
| 2008/0086759 A1 * | 4/2008 | Colson | 726/2 |

(Continued)

FOREIGN PATENT DOCUMENTS

WO 2005/025292 A2 3/2005

OTHER PUBLICATIONS

Mimg Ni, James D. Mc Calley "Software Implementation of Online Risk-Based Security Assessment", Aug. 2003, IEEE Transacions on Power system vol. 18 No. 3. pp. 1165-1171.*

(Continued)

*Primary Examiner* — Ghodrat Jamshidi
(74) *Attorney, Agent, or Firm* — Faegre Baker Daniels LLP

(57) ABSTRACT

In one example, a proxy server acts as a gateway to a website and modifies the traffic between a web browser on a user device and the website server, as necessary to request protection by providing step-up authentication and/or transaction verification. The proxy server blocks transactions when protection is required but has not occurred (either because the authentication was not proper or due to the detection of another problem). Associated methods and systems are also provided.

17 Claims, 15 Drawing Sheets

(56) References Cited

U.S. PATENT DOCUMENTS

| | | | |
|---|---|---|---|
| 2009/0089869 A1* | 4/2009 | Varghese | 726/7 |
| 2010/0005527 A1* | 1/2010 | Jeon | G06F 17/3089 726/22 |
| 2011/0213711 A1* | 9/2011 | Skinner et al. | 705/71 |
| 2012/0272131 A1 | 10/2012 | Carroll et al. | |
| 2012/0272133 A1* | 10/2012 | Carroll | G06F 17/30899 715/234 |

OTHER PUBLICATIONS

European Patent Office, PCT International Search Report for PCT Application No. PCT/US2014/027855, dated Aug. 4, 2014.
Entrust, "Security Beyond Today: Layered security for addressing fraud today . . . and adapting to tomorrow," XP055131615, Mar. 1, 2007; http://www.computerworld.com/pdfs/entrust_security_beyond_today_pdf.pdf.
Entrust, "Entrust TransactionGuard for Real-Time Fraud Detection," XP055131513, May 1, 2012; http://www.entrust.com/wp-content/uploads/2013/05/DS_Entrust-TransactionGuard_web_May2012.pdf.
Julie Sartain, "How to protect online transactions with multi-factor authentication—How-to—Techworld.com," XP055131477, Feb. 7, 2012; http://howto.techworld.com/security/3335614/how-to-protect-online-transactions-with-multi-factor-authentication/.
CA Technologies, "Product Sheet: CA Arcot RiskFort," Nov. 1, 2010, XP055131604; http://www.ca.com/~/media/Files/ProductBriefs/ca-arcot-riskfort-ps.pdf.
Entrust GetAccess Server 8.1; Product Guide; Document issue: 1.0; Dated Jan. 2013.
Entrust IdentityGuard 10.1; Deployment Guide; Document issue: 2.0; Dated Feb. 2012.
Entrust TransactionGuard 3.3.3; User Guide; Document issue: 2.0; Dated May 2012.
Prevent Online Banking Fraud with PhoneFactor Transaction Verification; from www.phonefactor.com; Mar. 14, 2014.
PhoneFactor; Transaction Verification; www.phonefactor.com; Mar. 2013.
European Patent Office Examination Report; EP Application No. 14729102.5; dated Jun. 28, 2016.
European Patent Office; EP Summons to Oral Proceedings; European Application No. 14729102.5; dated Feb. 3, 2017.
European Patent Office; Decision to Refuse Application; European Application No. 14729102.5; dated Sep. 4, 2017.
European Patent Office; Minutes of Oral Proceedings; European Application No. 14729102.5; dated Sep. 4, 2017.

* cited by examiner

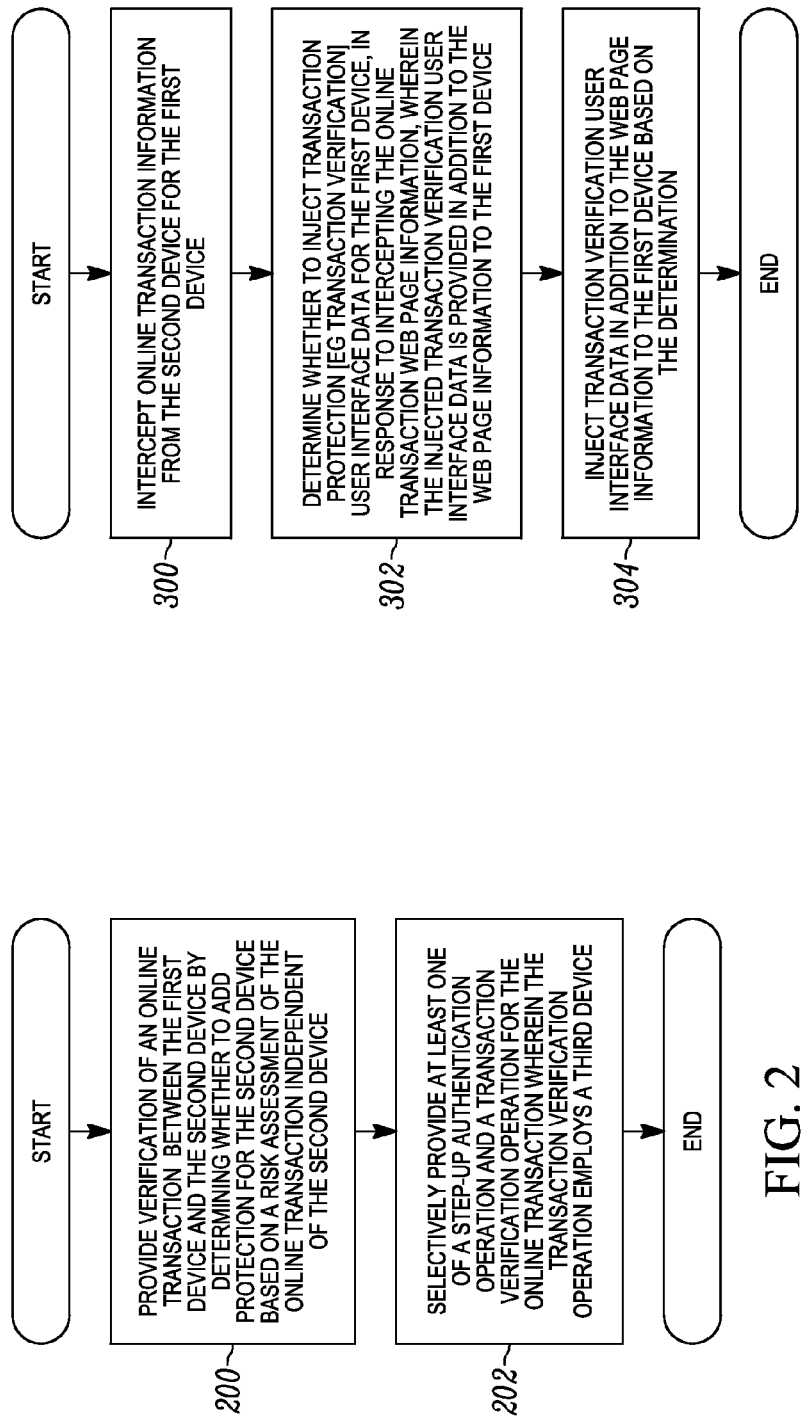

| Domain | SessionIdCookieName | Path | HttpMethod | ProtectionType | Risk Score | Sample URL |
|---|---|---|---|---|---|---|
| anybank.com | JSESSIONID | /WireTransfer | POST | STEP_UP_AUTHENTICATION | | https://anybank.com/WireTransfer |
| anybank.com | JSESSIONID | /BillPayment | POST | TRANSACTION_VERIFICATION | | https://anybank.com/BillPayment |
| anybank.com | JSESSIONID | /LoanApplication | POST | TRANSACTION_VERIFICATION | 1 | https://anybank.com/LoanApplication |

1600 {table above}, 1602 Sample URL, 1604 ProtectionType, 1606 Risk Score

FIG. 16

ONLINE SECURE TRANSACTION VERIFICATION SYSTEM PROXY SERVER AND METHOD

RELATED APPLICATIONS

This application claims priority to Provisional Application Ser. No. 61/789,417, filed on Mar. 15, 2013, having inventors Christopher Wood et al., titled "ONLINE SECURE TRANSACTION VERIFICATION SYSTEM PROXY SERVER AND METHOD", and is incorporated herein by reference.

FIELD OF THE DISCLOSURE

The disclosure relates generally to methods and apparatus that employ user authentication and transaction verification techniques for electronic transactions such as, but not limited to, product purchases, bill payments, money transfers, purchase or sales of securities, banking transactions, or any other transactions that require secure verifications and/or user authentication.

BACKGROUND OF THE DISCLOSURE

It is important to provide protection against malware in web browsers in an effort to prevent attackers from gaining access to critical resources or information of a user. Step-up authentication is a known security technique for computing devices which consists of employing an authentication mechanism other than a primary authentication operation to protect operations, resources and information. For example, a website may have a username/password authentication operation as a primary authentication mechanism however an additional level of security such as a second level of user authentication may also be employed such as using a one time password, grid card, other token based system or other technique to provide another level of authentication of the user.

Systems are also known wherein, for example, a web server (including a backend infrastructure hosting a website) receives a transaction request by a user device and the web server using the backend infrastructure calls into a risk based authentication platform to add step-up authentication and/or transaction verification. For example, a risk score or risk assessment that results in a risk score is carried out to determine when to apply step up authentication for an online transaction such as a banking transaction or other transactions. Transaction verification may employ, for example, the use of an additional device to verify that the transactions should be approved. Using an additional device in the process can add additional security for an online transaction involving critical information or access to important resources of a system. Systems are known to use a second channel (also referred to as a back channel) and an associated device such as a smart phone to get additional confirmation of a transaction if a transaction is being conducted, for example, on a laptop with a web server. However, such systems typically require the web server to have its applications modified to call an authentication platform that carries out the transaction verification operation using the additional device and out of band channel.

Transaction verification consists of the act of a user initiating a transaction on a device or system and before the transaction is accepted or processed by the backend system, the user receives details of the transaction on another device or system and is given the opportunity to approve or reject the transaction. For example, transaction verification systems are known to require a user to acknowledge information on a separate device from the device used to initiate the online transaction. In one example, an out of band communication to a user's smart phone requests confirmation of an online transaction while the user is online with a different device to provide additional security when, for example, large money balances are being transferred from one account to another, or for other high risk transactions. However, such systems typically require the hosting website to be modified to call into the risk based authentication platforms. The software applications that are on the website must typically be modified to force a call in to the authentication platform. This can result in very costly software modifications, require additional testing and increase rollout costs.

There are verification and transaction (proxy) servers—out of band transaction verification gateways known that attempt to protect a website server in a manner that does not require the platform hosting the website to be modified as to providing out of band transaction verification. However, such systems typically do not employ any type of transaction risk assessment so the system applies the out of band verification for all transactions it processes. This can create errors for users.

A need exists for an improved security system that employs step-up authentication and/or an improved online transaction verification.

BRIEF DESCRIPTION OF THE DRAWINGS

The embodiments will be more readily understood in view of the following description when accompanied by the below figures and wherein like reference numerals represent like elements, wherein:

FIG. 2 is a flow chart illustrating one example of a method for providing on-line protection in accordance with one example set forth in the disclosure;

FIG. 3 is a flow chart illustrating one example of a method for providing on-line security protection in accordance with one example set forth in the disclosure;

FIG. 16 is a diagram illustrating one example of configuration data that includes rule data in accordance with one example set forth in the disclosure.

DETAILED DESCRIPTION OF THE PREFERRED EMBODIMENTS

Figure 1:
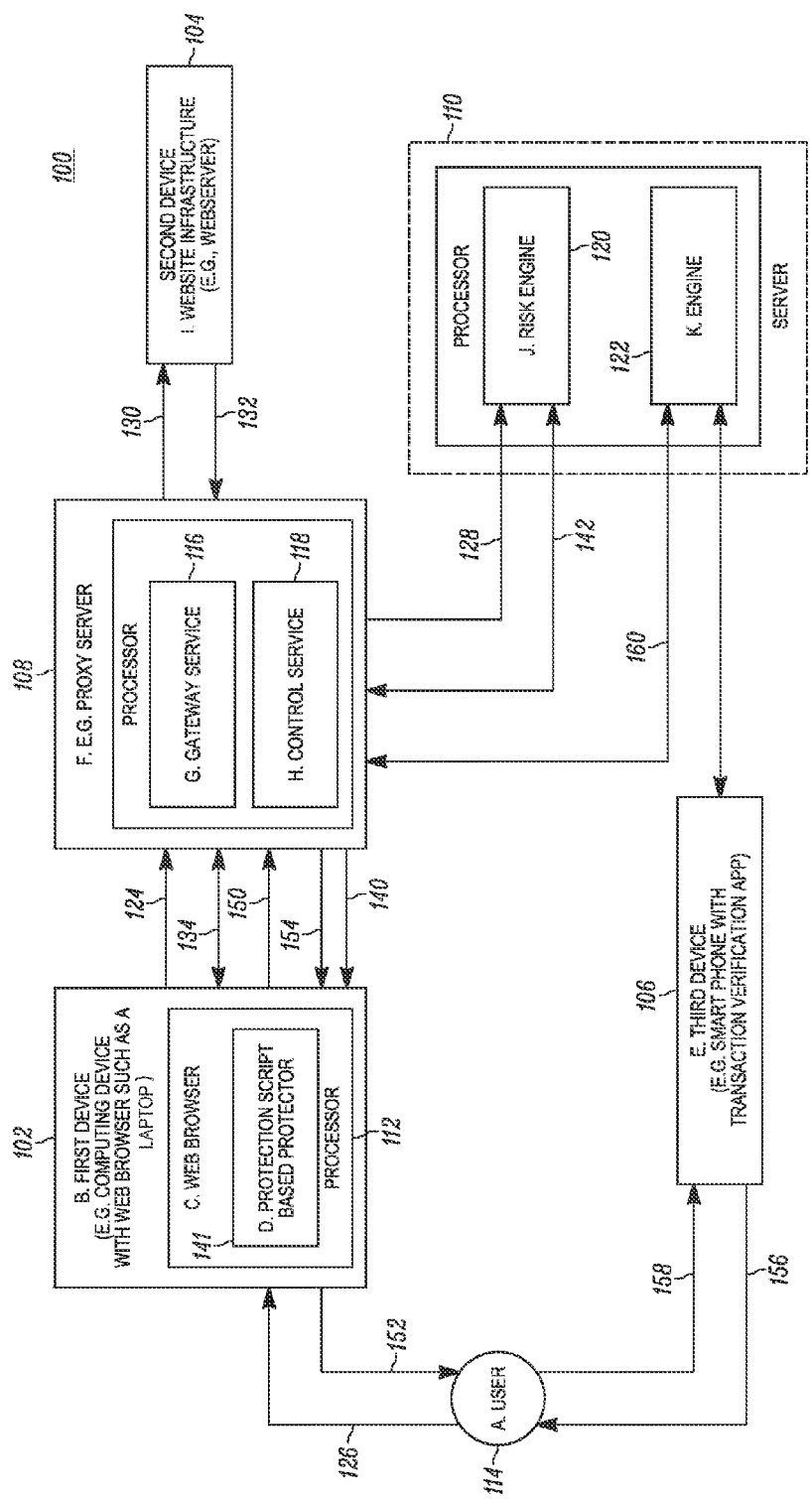
FIG. 1 is a block diagram illustrating one example of an on-line security protection system in accordance with one example set forth in the disclosure.

In one example, a proxy server acts as a gateway to a website and modifies the traffic between a web browser on a user device and the website server, as necessary to request protection by providing step-up authentication and/or transaction verification. The proxy server blocks transactions when protection is required but has not occurred (either because the authentication was not proper or due to the detection of another problem).

In one example, the proxy server injects one or more scripts into HTTP responses received from a website for a user device. The one or more scripts runs in the user's web browser allowing the proxy server to control and interact with the operation of the website for purposes of protecting the site by adding/enforcing step-up authentication and/or transaction verification. To deploy the transaction verification or step-up user authentication capability, the website server directs all traffic to the proxy server. As such, application code at the website server need not be modified and instead a proxy server is used to control determination as to whether to employ step-up authentication and/or transaction verification on a per session basis for an online transaction.

In another embodiment, a proxy system protects the website with step-up authentication and/or transaction verification based on a risk assessment of the actions performed by the user device that can be deployed without making the changes to the backend infrastructure hosting the website. A website operator may make a network level change to route all traffic originally intended for the website to the proxy server. The proxy server inspects traffic intended for the website and, based on configuration parameters by the website operator, injects user interface information such as graphical user interface information and control elements into the traffic that will request setup authentication and/or transaction verification as necessary for the online transaction. In one example, the proxy server handles all communication with a backend risk based authentication engine and blocks transactions when setup authentication and/or transaction verification is required but has not been completed successfully.

Step-up authentication, as discussed herein, shall include any authentication mechanism other than the primary authentication operation(s) already enforced by the website itself. For example, a website may have username/password authentication (a primary authentication mechanism) but deploy the system proposed here to add another form of authentication (e.g. grid card, one-time password, knowledge based, etc.) to add additional protection to a specific operation (or set of operations); this additional authentication is step-up authentication. Step-up authentication is not limited to any specific authentication mechanism; it can be any currently known or yet to be developed authentication mechanism.

Transaction verification, as discussed herein, includes the act of a user initiating a transaction on one device or system and before the transaction is accepted/processed by the backend system (second device), the user receives details of the transaction on a third device or system, and being given the opportunity to approve or reject the online transaction.

FIG. 1 illustrates one example of an online transaction verification system 100 that employs a user device 102 (e.g. first device), a server 104 (e.g. second device such as a web server or backend infrastructure component) and if desired, a transaction verification device (third device) 106 and a transaction protector 108 also referred to herein as a transaction protector proxy server. A supporting infrastructure server 110 may be part of or in communication with the transaction protector 108 and the third device 106. The devices may be in communication via any suitable network or networks. The system 100 may be, for example, any suitable communication system but is described for purposes of illustration and not limitation, as a web based system wherein the server 104 may be a web server operatively coupled to the internet and operatively coupled to a wired and/or wireless network. The server 104 may be for example, a web server (a server coupled to the internet) for a banking institution, other financial institution, or any other suitable organization that wishes to provide a service via an electronic transaction with a user of first device 102.

The user device 102 may be for example, a wireless internet appliance, radio telephone, laptop computer, tablet device or any other suitable device that is used to carry out an electronic transaction and in this example, includes a web browser 112 to facilitate a web based financial transaction or any other suitable transaction with the server 104. The device 102 includes as known in the art, one or more processors and associated memory that stores web browser code and other code that when executed, causes the one or more processor to serve as a web browser and provide other operations as described herein.

The first device 102 allows a user 114 to provide identification information such as a password and/or personal identification number to the server to facilitate user authentication such as a first level of user authentication, in any suitable manner as known in the art.

The server 104 may include for example, one or more processors and associated memory as known in the art to provide web server functionality. In this example the server 104 hosts a website that needs to be protected. However, any suitable hardware code configuration may be employed. The server may be one or more servers grouped together and may include suitable communication interfaces to communicate with other servers to provide web pages or web forms. In addition, any other suitable web information may be provided by the server 104 for the first device 102.

The third device 106 may be any suitable unit and in this example, is referred to as a wireless mobile device. However, any suitable device may be employed. The third unit includes, in this example, a wireless transceiver, one or more processors, a display and corresponding memory. The memory as known in the art stores instructions that when executed by the one or more processors, cause the one or more processors to carry out operations described herein.

The transaction protector 108 may be a proxy server interposed between the device 104 and the first device 102. In this example, the transaction protector 108 includes at least one or more processors and associated memory. The memory stores executable instructions that when executed cause the one or more processors to operate as a gateway service 116 and control service 118 as described herein. The transaction protector 108 is coupled to the first device 102, second device 104 and to the device 110 through any suitable communication connections as known in the art.

Device 110 includes one or more processors and associated memory that stores executable instructions that when executed by the one or more processors, causes the one or more processors to operate as a risk engine 120 and an authentication engine 122. The risk engine 120 and the authentication engine 122 can also be on separate servers or the risk engine 120 and authentication engine 122 may also be provided by the transaction protector 108.

Differing modes of operation of the transaction protector 108 will be described. It will be recognized that the system may be configured to only operate in one of the modes or can dynamically change to operate in a combination of modes. The transaction protector 108 serves as a server side product that can add protection to a website, based on, for example, a transaction risk score associated with a particular online transaction that is being processed, using step-up authentication and/or transaction verification, without requiring any changes to the website itself. The website merely needs to identify the transaction protector 108 (e.g., proxy server) as the server through which all transactions are handled. As such, instead of requiring a website to be modified to call into a risk-authentication platform to add step-up authentication and/or transaction verification as is typically done, the website operator need only make a network level change to route all traffic originally intended for the website, to the transaction protector 108.

The transaction protector 108 in this example is a proxy server device that inspects traffic intended for the website and, based on configuration, injects graphical-user interfaces and control elements into the traffic that request step-up authentication and/or transaction verification as necessary. The transaction protector 108 handles all communication with backend risk and authentication engines 120 and 122 and also blocks transactions when step-up authentication and/or transaction verification is required but has not been completed successfully.

The risk engine 120, as known in the art, is a server side component (e.g., processor executing code or discrete logic or combination thereof) that determines the risk of a given transaction based on the interactions of a user with a website. Such risk engines are available by way of example, from Entrust, Inc., and are referred to as Transaction Guard available from Entrust Inc., Texas. However any suitable product may be used. The authentication engine 122 is also a server side component that provides a second level of authentication (step-up) and/or transaction verification. Transaction verification is done using the third device 106 as known in the art. The authentication engine 122, as known in the art, may be for example of a type provided by Entrust, Inc. or any other suitable authentication engine. An example of an Entrust, Inc. authentication engine, also known as Identity Guard is available from Entrust Inc., Texas.

The third device 106 in this example is a smart phone that is capable of visually or audibly notifying a user of a transaction that requires verification and allows the user to confirm or reject the transaction as known in the arts. Applicant also incorporates by reference herein co-pending publication number 2011/0213711, application Ser. No. 12/715,199 entitled "Method, System and Apparatus for Providing Transaction Verification", filed Mar. 1, 2010 and owned by instant Assignee. Such disclosure provides one example of utilizing a third device to facilitate confirmation of an online transaction. However, any suitable technique may be employed.

Referring also to FIG. 2, a method for providing online transaction protection, which may be carried out, for example, by the transaction protector 108 includes providing verification of an online transaction between the first device 102 and the second device 104 by determining whether to add protection for the second device 104 based on a risk assessment of the online transaction, independent of the second device 104. In other words, the second device 104 does not initiate or perform risk assessment of the transaction. It is performed without the knowledge of the second device 104. This is shown in block 200. As further described below, the transaction protector 108 may receive a configuration file from the second device 104, other suitable source, or provided through a configuration user interface that defines the rules that the proxy server 108 is to use with respect to the given website. For example, if a website is a banking website, the web server 104 may provide a configuration file indicating the types of online transactions that require either step-up authentication and/or transaction verification operations. By way of example, a configuration file may indicate that all banking transactions in excess of $1,000 require step-up authentication as well as transaction verification using a third device 106. Another rule may be, for example, that any transactions above or below a certain amount only require step-up authentication, no additional authentication, or only transaction verification using the third device (see FIG. 16). Any other combination of protection may also be provided as set forth by the configuration information. As such, a configuration file (see e.g., FIG. 16) or other form of configuration information may be stored in memory accessible by transaction protector 108 (or pushed to device 108) and is used to determine whether to add protection for the second device 104 based on a risk assessment of the transaction.

In this example, the risk engine 120 is accessed by the transaction protector 108 to determine the level of risk of a given transaction. Once the level of risk is determined, the method includes, as shown in block 202, selectively providing step-up authentication operation for the transaction, transaction verification operation for the online transaction, or combination of both levels of protection. The transaction verification operation as used in this disclosure employs use of a third device, such as device 106 for the user. The method then continues for each online transaction as desired.

Determining risk assessment of the online transaction is performed in one example by intercepting online transaction information, such as web pages, from the second device 104 for the first device 102 or by intercepting online transaction information flowing from the first device 102 that is destined for the second device 104. The intercepting is done by the transaction protector 108 as interposed between the first device and the second device. The risk assessment is provided by the risk engine 120 in response to communications from the transaction protector 108 as further set forth below. Step-up authentication is performed using the authentication engine 122 and transaction verification is also performed using authentication engine 122 and third device 106 as further set forth below.

Referring to FIG. 3, another embodiment of the disclosure includes a method for providing verification of an online transaction carried out, for example, by the transaction protector 108 which in this example, need not include a risk assessment of the online transaction. However, providing a risk assessment for the online transaction under control of the transaction protector (proxy) 108 will also be described below. In one example, the method includes as shown in block 300, intercepting online transaction information flowing from the second device 104, such as a webpage from a website from the second device 104 that is destined for the first device 102. This may be done, for example, based on a request for a webpage from the first device 102 that may be provided through the transaction protector 108. As shown in block 302, the method includes determining whether to inject transaction protection user interface data 140 (also referred to as transaction verification user interface data 140) for the first device 102, such as a graphic user interface, that is presented by the web browser 112 on the first device 102 in response to intercepting the online transaction webpage information. The injected transaction verification user interface data 140 is provided in addition to webpage information from the second device 104. In other words, the transaction protector 108 not only provides the webpage provided by the second device, but also injects transaction protection user interface data 140 such as in the form of JavaScript, or other suitable technique, and provides both the webpage and the injected transaction protection user interface data for presentation in a web browser on the first device 102. As shown in block 304, the method includes injecting the transaction verification user interface data 140 in addition to the webpage information for the first device based on the determination whether to inject the protection user interface data. The determination as to whether to inject the transaction protection user interface data for the first device 104 may be done for example, based on a risk assessment of the online transaction, or based on some other criteria.

In another embodiment, the transaction protector 108 employs a risk assessment determination independent of the second device 104 meaning that the second device 104 need not include the code or initiate a risk assessment of an online transaction. Instead, this is carried out under control of the transaction protector 108. Based on the risk assessment by the transaction protector (i.e. proxy server) 108, a determination is made whether to provide no additional authentication operation, a step-up authentication operation and/or a transaction verification operation for the online transaction.

Figure 4:
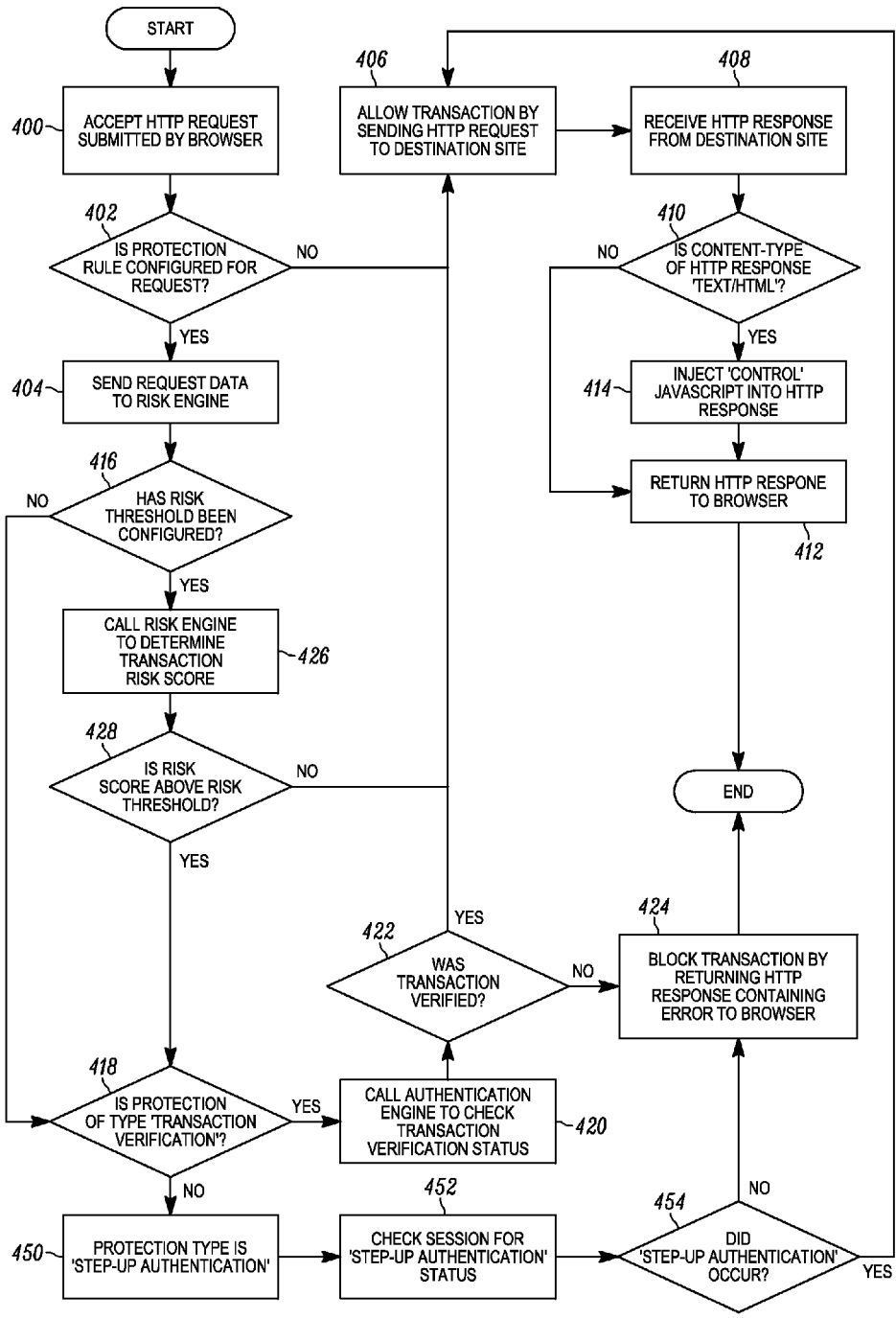
FIG. 4 is a flow chart illustrating one example of a method for providing on-line protection for a transaction in accordance with one example set forth in the disclosure.

FIG. 4 illustrates one example of the operation of the transaction protector 108. As shown in block 400, the method includes accepting an HTTP request 124 submitted by the user through a web browser 112. For example, a user may request access to a protected website. For example, the user may activate a website selection that is received by the web browser of the first device as shown by data 126. In response, the web browser then makes a request 128 for access to a protected website. As shown in block 402 the request data 128 for the transaction is sent to the risk engine. As shown in block 404, the method includes determining if a protection rule has been configured for this request. This is determined, for example, by evaluating the rule data such as shown in FIG. 16. In this example, if the HTTP method is a "get" then there is no protection. The rules are programmable and they can be configured to protect any type of transaction based on an HTTP request type (GET, POST, PUT, DELETE, etc). In the example provided in FIG. 16, there is no protection on any GET request, although this protection can be added if necessary. Generally, the initial request (a GET request) to load the webpage is not protected. However, any request after that can be protected. For example, if one GET request was used to load the site, followed by another GETrequest to display some sensitive information (social security number for example), one might want to protect this second request with step-up authentication.

The transaction protector 108 stores a configuration file or has the rule data in a database, for example, indicating whether protection has been set up for the website. If no protection rule has been configured for the request, as shown in block 406, the method includes allowing the transaction to continue by sending the HTTP request onto the web server 104. This is shown by data 130. As shown in block 408, the method includes receiving the HTTP response from the web server shown as data 132. As shown in block 410, the method includes determining if the content type of the HTTP response contains html, if the content type is not text or html, then no script is added and the method includes, as shown in block 412, returning the HTTP response to the browser shown as data 134. However, if the content type of the HTTP response 132 is text or html, as shown in block 414, the method includes injecting transaction protection user interface data into the HTTP response without modifying the appearance of the HTTP webpage (e.g. parent window). As used herein, the transaction protection user interface data 140 is also referred to as "control" JavaScript which is executed in the web browser of device 102 by a processor (e.g. CPU) of the first unit and the executing processor operation is shown as protection script based protector 141. The control script is positioned by 108 as the first script in the HTML body of the web page.

Returning back to block 404, if it is determined that a rule has been configured for this request. the method continues as shown in block 416 where the risk engine 120 determines if a risk threshold has been configured. If not, as shown in block 418, the method continues by determining if protection for the transaction is of the type "transaction verification" meaning that the online transaction requires transaction verification through the third device 106. If the answer is yes, as shown in block 420, the authentication engine is used to check the transaction verification status. If the transaction was verified as shown in block 422, the method continues to block 406. However, if the transaction was not verified, the method continues to block 424 where the transaction is blocked by the proxy server 108 and a response is sent to the browser indicating an error occurred such as through data 134.

Returning back to block 416, if a risk threshold has been configured for the request, the method includes calling the risk engine 120 to determine the transaction risk score as shown in block 426 and data on link 142. If the risk score returned by the risk engine is above a threshold, as shown in block 428, the method continues to block 418. However, if the risk score is below a risk threshold, the method continues to block 406.

Returning to block 418, if the risk score is above the risk threshold and the protection is not of the type "transaction verification", then it is assumed that the protection type is to provide a "step-up authentication process" as shown in block 450. As shown in block 452, the method includes checking the online session for the step-up authentication status, such as by the authentication engine 122 and if the step-up authentication occurred, as shown in block 454, the method continues to block 406. However, if step-up authentication did not occur, then the method continues to block 424. The proxy server 108 provides a step-up authentication of a user of the first device based on the injected transaction verification user interface data 140.

Stated another way, the transaction protector 108 includes logic (e.g. one or more programmable processors, discrete logic including state machines, FPGAs, DSPs or any continuation of hardware and/or software) that acts as a gateway to the website that injects/modifies the traffic (between the web browser and the website) as necessary to request protection (step-up authentication and/or transaction verification) and blocks transactions when protection is required but has not occurred without requiring program changes to applications on the website.

The injected data consists of one or more scripts that are injected into the HTTP responses received from the website and runs in the user's web browser allowing the transaction protector 108 to control and interact with the operation of the website for the purpose of protecting the site (adding/enforcing step-up authentication and/or transaction verification).

The authentication engine 122 is capable of carrying out step-up authentication and/or transaction verification as known in the art. The transaction risk engine 120 is capable of determining the risk of a given transaction based on the interactions of the user with a website as known in the art.

Figure 5:
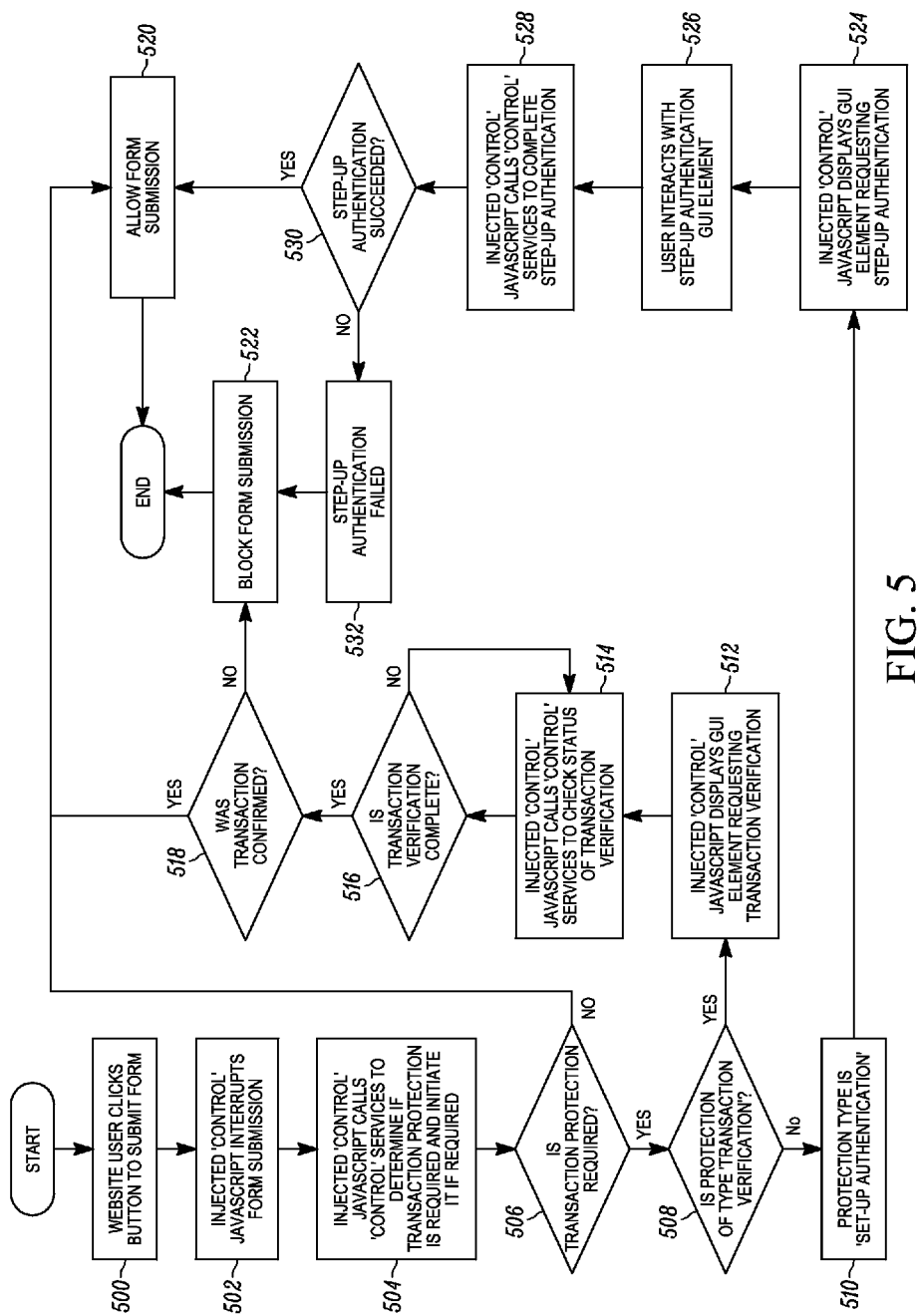
FIG. 5 is a flow chart illustrating one example of a method for providing on-line security protection in accordance with one example set forth in the disclosure.

FIG. 5 is one example of a method for providing verification for online transaction which includes the method of operation for the gateway service 116. The transaction protection user interface data 140 in this example, has already been injected into a response by the protection server 108. As shown in block 500, when the web browser 112 presents a website that includes, for example a web form, the web browser 112 can receive an input based on the user clicking a button in the form to submit a form presented by the web browser. The form is for the selected secure website. As shown on block 502, the method includes interrupting the form submission by the web browser using the injected transaction protection user interface data. For example the control java script interrupts the form submission using the injected transaction protection user interface data that was injected with the web page by the transaction protector (proxy server) 108. The injected transaction protection user interface data includes graphic user interface script code for the web browser, that when executed causes the first device to display, in one example, a step up authentication graphic user interface and/or a transaction verification graphic user interface.

As shown on block 504, the method includes calling, by the first device 102, the control service 118 of the transaction protector 108. A call is shown as data in communication 150 (see FIG. 1). The first device, executing the script determines if the transaction protection is required as shown on block 506 by evaluating a received response from the control service that includes transaction protection details based on the rule data. As shown in block 508, if transaction protection is required, the method includes determining if the protection is of the type "transaction verification" or if the protection type is "step up authentication", as shown on block 510. Again, this is done based on the data in the received response. The protection type is indicted for example by the configuration information for the particular website sent in the response.

If the protection type is "transaction verification" as shown on block 512, the method includes the processor 112 displaying the graphic user interface through the web browser requesting transaction verification, also referred to as displaying a transaction verification graphic user interface. As shown by arrow 152 the transaction verification GUI is perceived by the user. As shown in block 514, the method includes the protection script based protector 141 checking the status of the transaction verification such as by a request 150 and received response 154. Response 154 may be for example from the proxy server 108 indicating that the authentication engine 122 has been asked to communicate with a third device to provide transaction verification such as by presenting on the third device, information unique to the transaction through a GUI as indicated for example by arrow 156. The third device receives confirmation or rejection data through a transaction verification GUI, as known in the art from a user as illustrated for example by arrow 158.

As shown in block 516, the method includes determining if the transaction verification is complete. If it is not, the method includes waiting for the transaction verification completion information such as data 154 from the transaction protector 108. If the transaction has been confirmed as shown on block 518 such as by the authentication engine 122 receiving the proper verification information from the third device and informing the protection on the transaction protector 108 of the same, the protector server 108 provides a positive verification communication through response 154. The form submission is allowed as shown on block 520. However, if the transaction was not verified via the third device 106 in a proper manner, as shown on block 522 the method includes the transaction protector 100 blocking the form submission. Blocking the form submission is communicated by the transaction protector 108 to the response 154 indicating to the protection script based protector 141 that transaction verification was not satisfied.

Figure 10:
FIG. 10 is an example of a graphic user interface illustrating step up authentication in accordance with one example set forth in the disclosure.

Referring back to block 510, if the protection type is "step up authentication" then the method includes the protection script 140 (e.g. the processor executing the control script) displaying a step up authentication GUI as shown on block 524 (see also FIG. 10). As such the protection script 140 presents a step up authentication GUI so that the user can provide a second level of user authentication for the online transaction. As shown in block 526, the method includes the receiving of step up authentication information through the GUI element. As shown in block 528, the method includes the protection script 140 sending a request 150 such as a call to the control service 118 to complete step up authentication. Step up authentication is carried out for example by the transaction protector 108 requesting the authentication engine 122 to provide authentication of the step up information received from the step up authentication GUI (see e.g., FIG. 10).

As shown on block 530, the method includes determining if the step up authentication has succeeded such as by the authentication engine 122 informing the transaction protector 108. As known in the art the authentication engine 122 determines whether the received step up authentication information from the first device matches expected authentication information from the user. If so, the authentication engine 122 will communicate a response through link 160 to the protection server 108. The protection server 108 also provides the step up authentication data received from the GUI as provided from the first device, indicated for example through response 150. If step up authentication has succeeded, the transaction protector 108 informs the protection script 140, such as through reply, to allow form submission. If not, the transaction protector 108 provides an indication that step up authentication has failed to the protection script 140 as shown in block 532 and as shown in block 522 the transaction protector 108 will block form submission.

The transaction protector 108 is operative to inject the transaction protection user interface data 140 without modifying the web page information on a second device (e.g., without modifying the appearance of the webpage or parent window) and the transaction protector 108 is operative to block online transaction requests to the second device in response to unsuccessful verification of the transaction. The transaction protector 108 using the authentication engine 122 for example, verifies the transaction for the second device and through the use of the authentication engine provides step up authentication of the user of the first device based on the injected transaction protection user interface data 140. The script also blocks transactions from occurring as shown in FIG. 5. Therefore two levels of blocking are provided by the system in case the script 140 is prevented from running on the user device.

Figure 6:
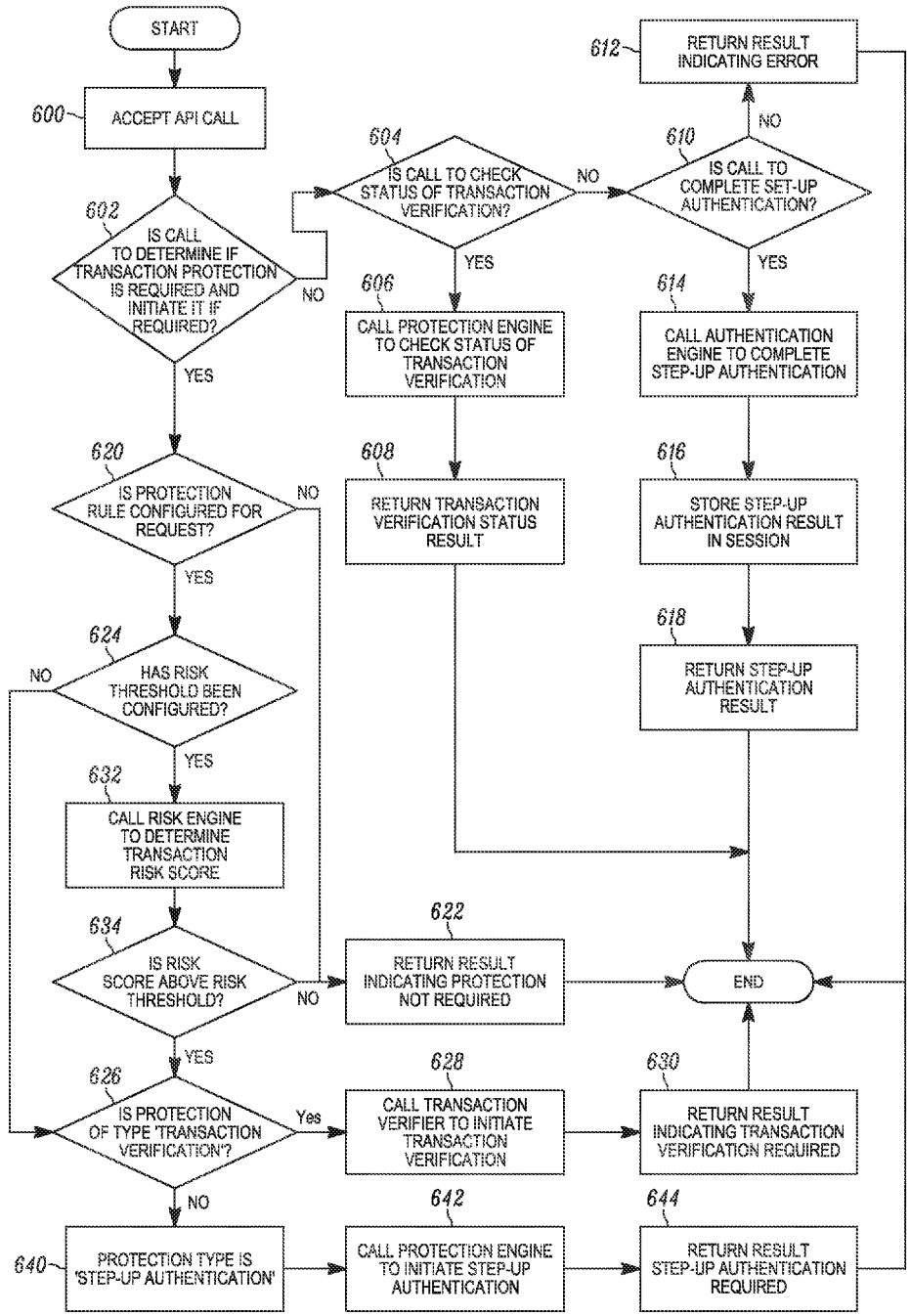
FIG. 6 is a flow chart illustrating one example of a method for providing on-line security protection for a transaction in accordance with one example set forth in the disclosure.

FIG. 6 illustrates a method for providing verification for an online transaction which illustrates in part, the operation of the transaction protector 108 and in particular the control service 118 in conjunction with the risk engine 120. As shown in block 600, the control service 118 accepts an API call through request 150 from the first device. As shown on block 602, the method includes the control service 118 determining if the API call is to determine if transaction protection is required (and initiate transaction protection if required). If the API call was not to determine if transaction protection is required, the method includes as shown in block 604, the control service 118 determining if the API call is a call to check the status of a transaction verification. If yes, as shown on block 606 the method includes the control service 118 calling the authentication engine to check the status of the transaction verification. As shown in block 608, the method includes returning the transaction verification status result shown by communication 154 to the first device.

Referring back to block 604, if the API call is not a call to check the status of a transaction verification, the method includes, as shown on block 610, determining if the call is to complete a step up authentication. If the call is also not to complete a step up authentication then an error is returned as shown in block 612. However, if the call is to complete a step up authentication, as shown on block 614, the method includes calling the authentication engine to complete the step up authentication. As shown on block 616, the method includes storing the step up authentication result from the authentication engine and returning the step up authentication result via response 154 to the first device, as shown on block 618.

Referring back to block 602, if the API call to the control service 118 indicates that transaction protection is required, the method includes determining if a protection rule is configured for the request 150 as shown on block 620. This is done by evaluating the configuration information.

As shown in block 620 a determination is made as to whether a protection rule has been configured for the request if not, as shown in block 622, the method includes returning a result to the first device indicating that protection is not required. For example, this may be done using response 154. As shown in block 624, if the protection rule is configured for the request, the method includes determining if a risk threshold has been configured. If a risk threshold has not be configured, the method continues to block 626 where the control service 118 determines if the protection is of the type "transaction verification" and if so the protection engine is called to initiate transaction verification as shown in block 628. As shown on block 630, the result from the authentication engine 122 that carried out the transaction verification using the third device 106 is provided as response 154.

Referring back to block 624, if a risk threshold has been configured, as shown in block 632, the method includes the control service 118 calling the risk engine 120 to determine the transaction risk score through communications 142. As known in the art, the risk engine 122 receives the data for the transaction in this example uniquely from the transaction protector 108 which is a proxy server, so that the web server 104 is not configured to carry out a risk assessment. The risk score is provided by the risk engine 120 to the control service 118. As shown on block 634, the control service 118 determines if the risk score is above a threshold and if so, the method proceeds to block 626. However, if not, then the method continues to block 622.

Referring to block 626, if the protection is not of the type "transaction verification," then in this example the transaction type is a "step up authentication type" as shown on block 640. As shown on block 642, the method includes the control service 118 calling the authentication engine to initiate step up authentication. The authentication engine 122 carries out the step up authentication process and provides the result as indicated through link 160 which is then provided by the transaction protector 108 to the protection script 140 as shown through response 154. This is shown on block 644.

As such, the transaction protector 108 provides a risk assessment of the online transaction utilizing, for example, risk engine 120 independent of the second device 104. The transaction protector 108 also determines whether or not an out of band verification process using a third device should be carried out for the online transaction based on the risk assessment of the online transaction. For example, as shown on block 634 if the risk score is above a threshold indicating a high risk transaction if security is not provided, and the rule data indicates that for that above risk threshold level that transaction verification should be employed, the authentication engine 122 initiates transaction verification. The risk assessment of the online transaction in this example is done concurrently with the online transaction so that the session is maintained while the risk assessment is being completed.

If desired, the transaction protector 108 may include a configuration controller which may be for example, a suitably programmed processor that provides a configuration user interface, such as a graphic user interface, that includes selectable online transaction verification risk rule data, so that for example when the configuration is set up for the website, an administrator can select for example which types of transactions require protection such that a rule has been configured for the type of request. However any suitable configuration mechanism may also be employed such as the downloading of a configuration file, script, database elements, or any other suitable mechanism.

Figure 7:
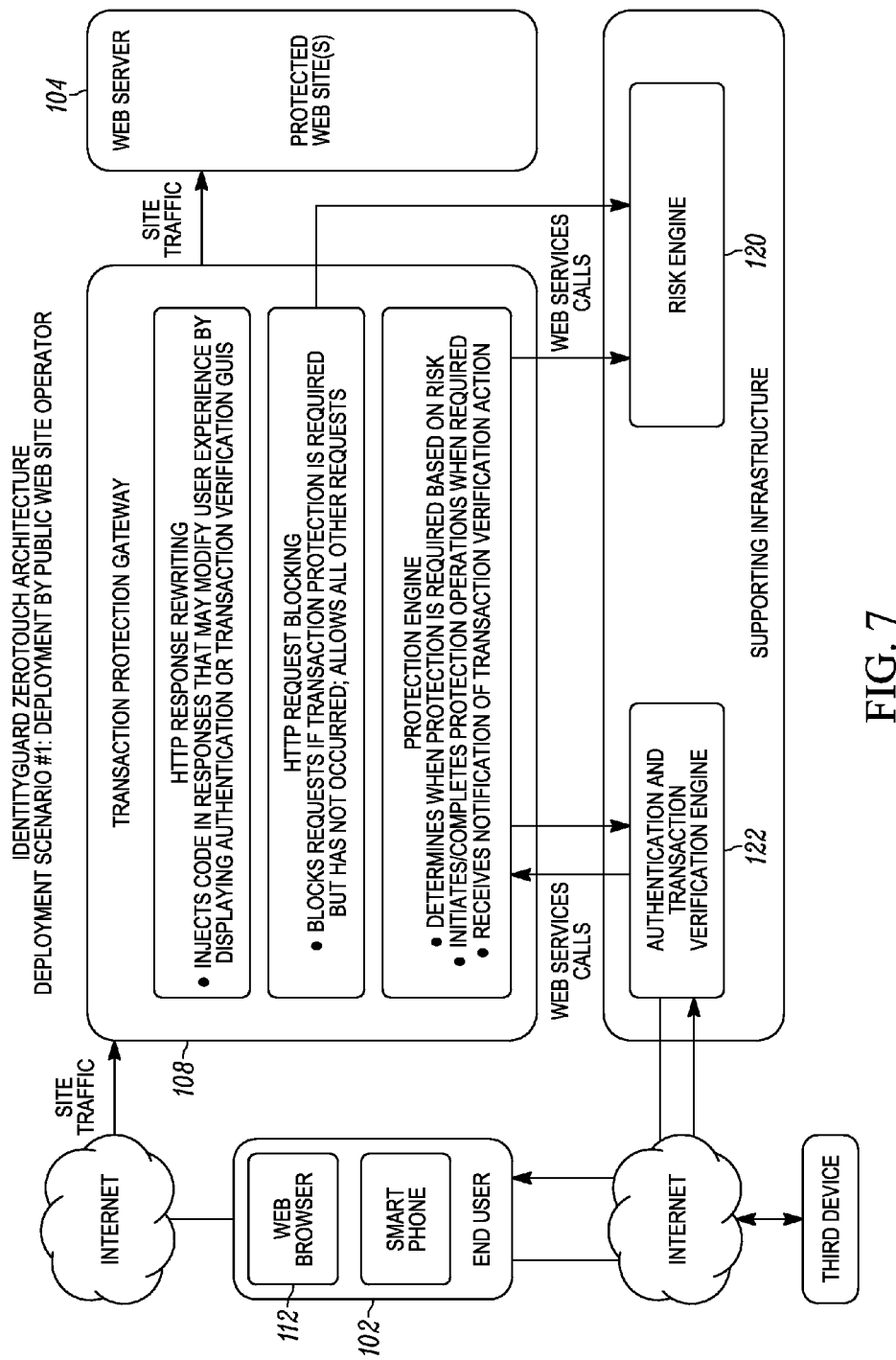
FIG. 7 is an illustration of one example of a system for providing security protection for an on-line transaction in accordance with one example set forth in the disclosure.

FIG. 7 diagrammatically illustrates one example of a system for providing verification for online transactions.

In this illustration, the web server 104 is configured such that the site traffic coming from the transaction protector 108 would not be passed through the internet. This deployment may be used for example by a public website operator. This example deployment shows how a public web site provider can protect the site they offer with the transaction protector 108. Typically this type of protection would apply to all web-site users, since the network changes to cause routing to the transaction protector would be made server side (in the web-site provider's network).

Figure 8:
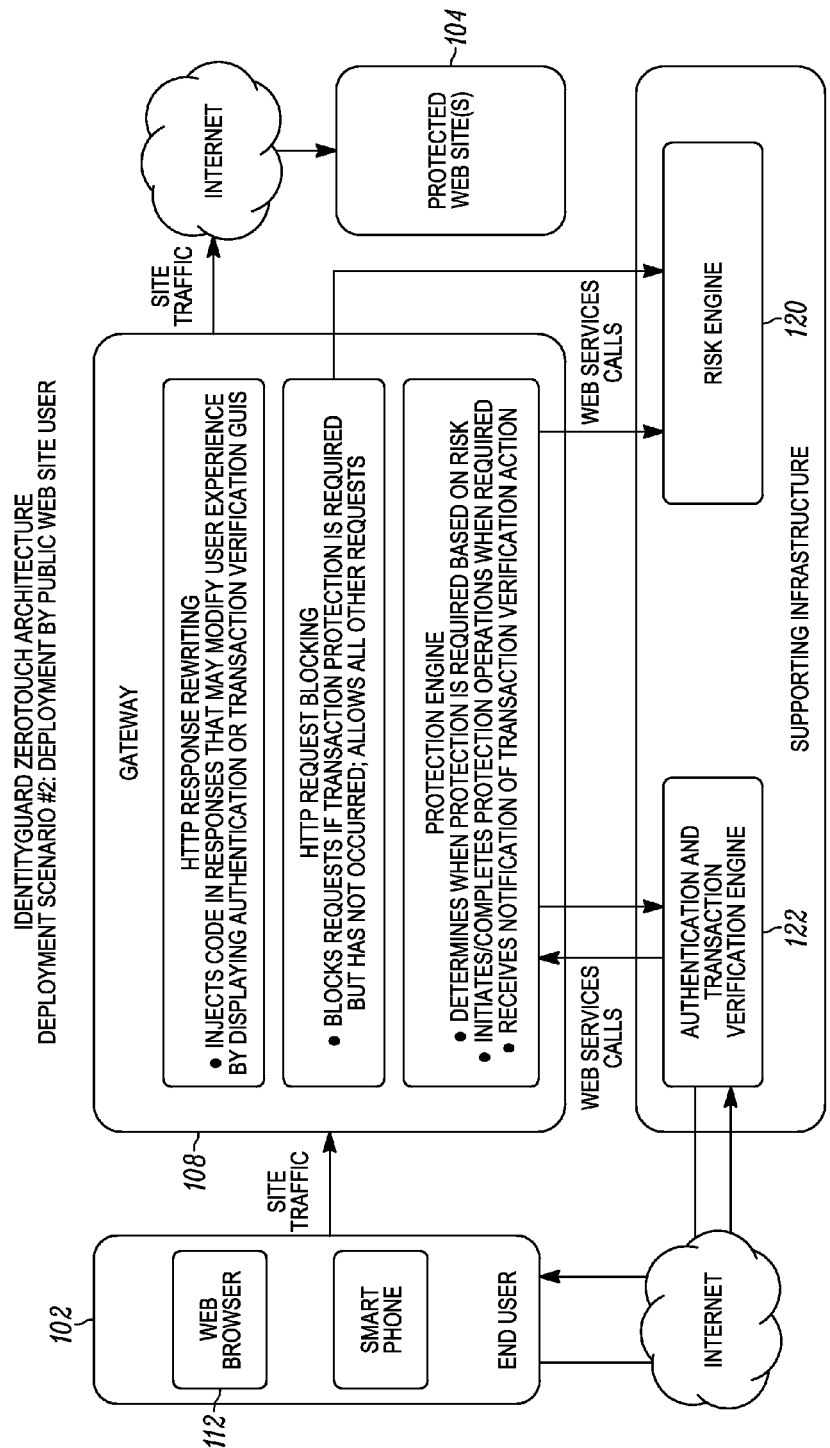
FIG. 8 is an illustration of one example of a system for providing security protection for an on-line transaction in accordance with one example set forth in the disclosure.

FIG. 8 is another embodiment showing a different system architecture that may be employed for example by a public website user such that site traffic is passed from the transaction protector 108 through the internet to the web server 104. Generally the site traffic from the first device 102 need not be passed through the internet to the transaction protector 108. This example deployment shows how a user (or group of users)of a public web site can protect the site they use with the transaction protector. This protection scenario does not require cooperation from the web site provider; in fact, the web site provider may not even know that the transaction protector is being used by their site users. This type of protection only applies to users who have made the necessary network configuration changes in their network to route traffic through the transaction protector 108.

Figure 9:
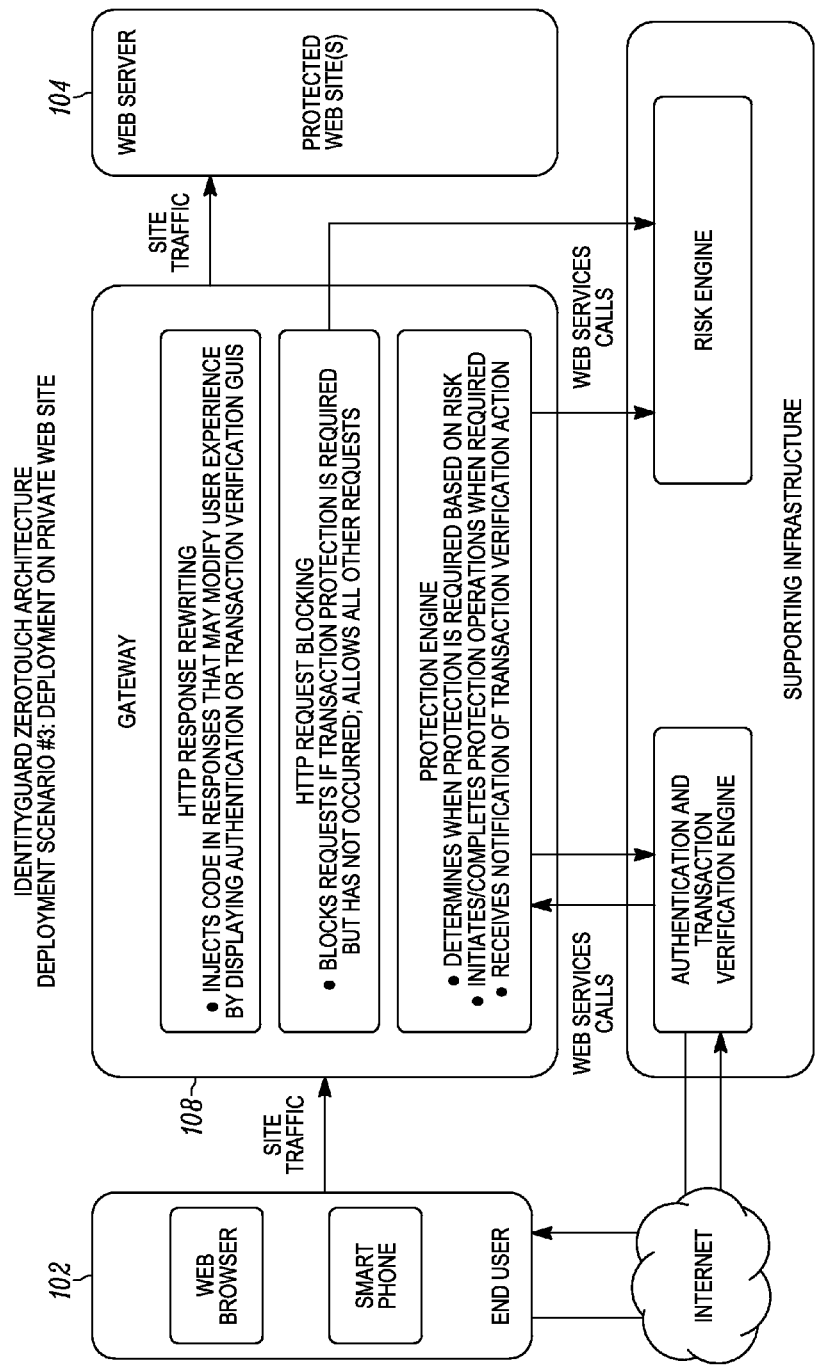
FIG. 9 is an illustration of one example of a system for providing security protection for an on-line transaction in accordance with one example set forth in the disclosure.

FIG. 9 illustrates another example of a different system architecture that may be employed for example by a private website so that site traffic from the transaction protector 108 is not passed through the internet to the protected web server 104, unlike that shown in FIG. 8. Connections in FIG. 1 may pass over a network or the internet; in FIGS. 7-9, the diagrams are illustrating more explicitly about when the connection passes over the Internet. For step-up authentication, there is no communication between the authentication engine and the $3^{rd}$ device; for transaction verification there is.

Below are some examples of operation of the system.

Step-up Authentication.

Figure 12:
FIG. 12 is one example of a graphic user interface in accordance with one example for providing secure on-line transaction in accordance with one example set forth in the disclosure.

One usage of the architecture is to protect a website with step-up authentication; one example of this process is as follows. A user (A) attempts to load a website by interacting with their web browser (C) to request a protected website be loaded. Then: web browser (C) sends a request to load the website to the transaction protector 108 (F). The gateway service (G) 116 passes the request to load the website on to the web server 104. Web server 104, replies to the request to load the website, (e.g. page) by returning a response to the gateway service (G) 116. The gateway service (G) injects protection script (D) 140 into the response and returns the response (and injected script) to web browser (C). Web browser (C) displays the website (see FIG. 12) to User (A) that requested it.

After the website is loaded and the protection script is stored in the first device 102, the User (A) attempts to perform an operation that is configured for step-up authentication protection in the transaction protector 108.

Figure 11:
FIG. 11 is one example of a graphic user interface in accordance with one example for providing secure on-line transaction in accordance with one example set forth in the disclosure.

User (A) interacts with their web browser (C) to initiate a protected operation with the website. The protection script based protector (D) 141 intercepts the attempt to initiate the operation and communicates with control service (H) 118 to protect the transaction if necessary. Control service (H) 118 communicates with risk engine (J) 120 notifying it of the operation and requesting a risk assessment. For risk scores received from the risk engine 120 above the configured threshold, control service (H) 118 communicates with the authentication engine (K) 122 to initiate step-up authentication. The protection script based protector (D) 141 receives an authentication challenge from the control service (H) 118 as provided by the authentication engine 122 and injects a step up authentication GUI 1000 requesting authentication by the User (A); (refer to FIG. 10). User (A) responds to the authentication challenge by interacting with the injected GUI element 1000. In this example the user has a secure and unique grid card stored in their device as a second level authorization element. However any suitable step up authorization techniques may be employed. The protection script based protector (D) 141 communicates with the control service (H) 118 to validate the reply to the authentication challenge of the user. The control service 118 communicates with authentication engine (K) 122 to validate the reply to the authentication challenge. The protection script based protector 141 (D) either blocks the operation or allows the operation, if allowed, the request is sent to gateway service (G) 116. The gateway service (G) 116 ensures that the necessary step-up authentication has been performed (otherwise it blocks the operation) and if so passes the request on to the web server 104 (I). The web server 104 (I) returns a response containing result of operation to the gateway service (G) 116, which returns response 1100 (e.g. web page) to the web browser (C), which displays the response to User (A) that initiated it. (Refer to FIG. 11.)

Transaction Verification:

Another usage of the deployment architecture is to protect a website with transaction verification; this process is as follows:

1.) User (A) attempts to load a website by interacting with their web browser (C) to request a protected website be loaded. The web browser (C) sends a request to load website to the transaction protector 108. The gateway service (G) 116 passes the request to load website from the second device 104. The second device 104 replies to the request to load the website by returning a response to gateway service (G) 116. The gateway service (G) 116 injects the protection script (D) 140 into the response (injected script and website) to the web browser (C). web browser (C) displays the website to User (A) that requested it; refer to FIG. 12.

2.) User (A) attempts to perform a transaction that is configured for transaction verification protection in the transaction protector 108 (D). User (A) interacts with their web browser (C) to initiate a protected transaction with the website. Protection Script (D) based protector 141 intercepts the attempt to initiate the transaction and communicates with the control service (H) to protect the transaction if necessary. The control service (H) 118 communicates with risk engine (J) 120 notifying it of the transaction and requesting a risk assessment. A risk score is provided by the risk engine 120.

Figure 13:
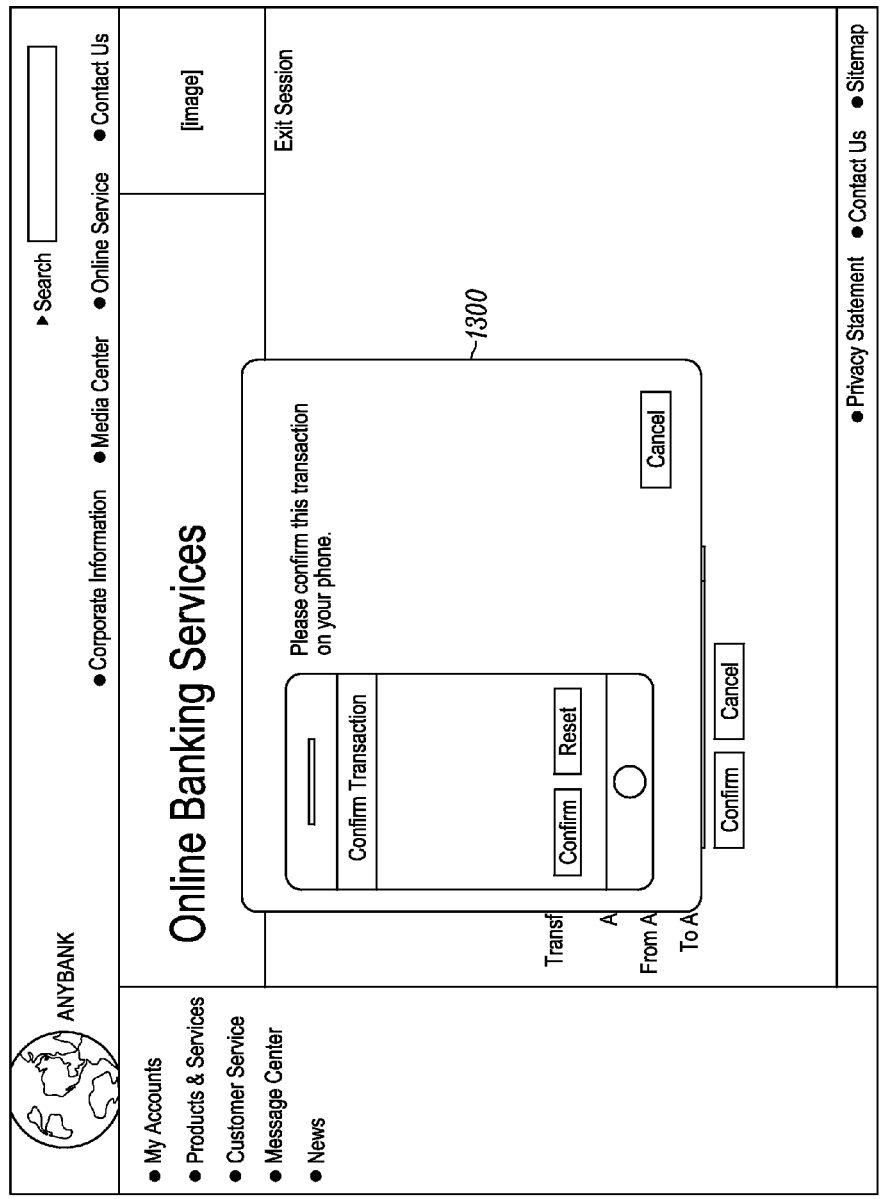
FIG. 13 is one example of a graphic user interface in accordance with one example for providing secure on-line transaction in accordance with one example set forth in the disclosure.

For risk scores above the configured threshold, control service (H) 118 communicates with the authentication engine (K) 122 to perform transaction verification. The authentication engine (K) 122 communicates with third device (E) requesting transaction verification. The protection script (D) based protector 141 polls control service (H) for result of transaction verification, displaying a transaction verification GUI 1300 indicating that transaction verification is required; refer to FIG. 13.

Figure 14:
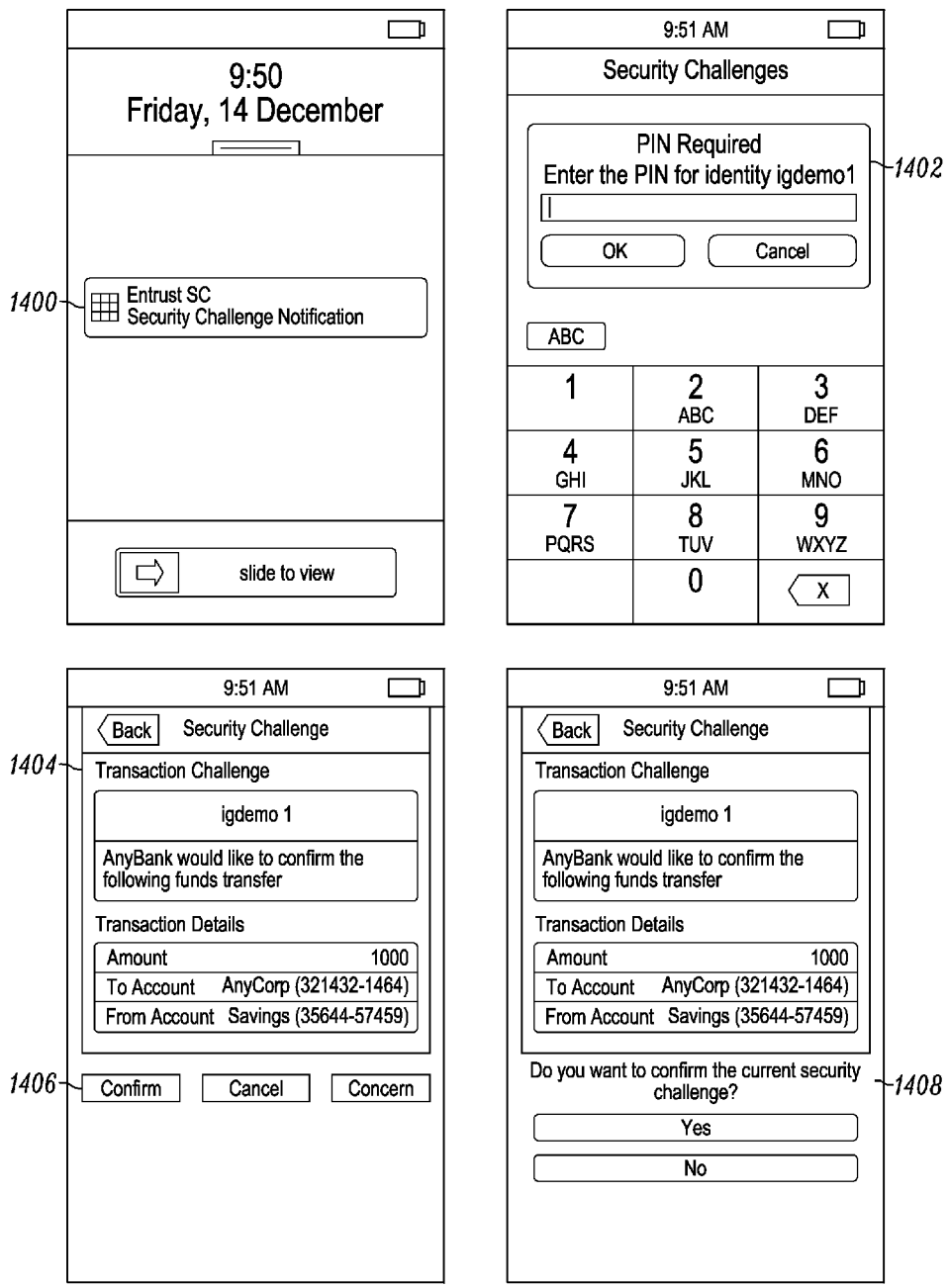
FIG. 14 illustrates differing graphic user interfaces for providing transaction verification in accordance with one example set forth in the disclosure.

Referring to FIG. 14, User (A) responds to transaction verification request by interacting with third device (E). In this example a security challenge notification 1400 is sent to the third device 106 of the user, such as a smart phone. The third device 106 carries out known transaction verification techniques by executing an application stored in memory which presents for example the screens shown in FIG. 14. As shown a personal identification (PIN) request is presented as shown as 1402. The PIN information is received and compared to an expected PIN by the third device, or another device if desired. If the PIN matches, the security of the transaction information 1404 is shown indicating for example the amount of the transaction, the account information and confirmation is requested. Once confirmation is received by for example, the user hitting the "confirm" button 1406, the user is again asked if they want to confirm the security challenge by verification data 1408. If the user for example selects "Yes" then the third device notifies the authentication engine of the transaction verification result indicating that the user affirmed the transaction. The protection script (D) 140 through polling control service (H) learns the result of transaction verification operation. The protection script (D) 140 either blocks the transaction or allows the transaction, in which case the request is sent to the gateway service (G). The gateway service (G) communicates with the authentication engine (K), ensuring that transaction verification occurred successfully (otherwise it blocks the transactions) and if so passes the request on to the website infrastructure (I).

Figure 15:
FIG. 15 is one example of a graphic user interface for providing secure on-line transaction protection in accordance with one example set forth in the disclosure.

The second device 104 returns a response containing the result of transaction to the gateway service (G), which returns the response to the web browser (C), which displays the response 1500 to User (A) that initiated it; refer to FIG. 15.

Stated another way, an apparatus provides verification for online transactions between a user device and a service providing device. The apparatus includes an interface operative to receive online transaction web page information from a user device and from a service provider device; and a transaction protector operative to provide a risk assessment of the online transaction concurrently with the online transaction in real time independent of the second device and operative to determine whether at least one of a step-up verification operation and an out of band verification process using a third device should be carried out for the online transaction based on the risk assessment of the online transaction.

FIG. 16 illustrates one example of configuration information as used by the transaction protector 108 and includes in this example rule data 1600 which indicates for example for a given website URL 1602, the protection type 1604 (e.g., step up authentication or transaction verification is desired or both) along with a risk score 1606. Also indicated is the path because different resources (operations, transaction, etc) on the web site are accessed through different paths; the path is required to uniquely identify the various resources.

Also shown is an indication of a domain, session ID cookie name, HTTP method such as a "post" or a "get". The domain is the unique identifier for the web site. The path is the unique identifier for a resource location on a given website. The HTTP method is a unique identifier for a particular way of accessing a given resource on a website (use of different HTTP methods or a given domain and path can cause different transaction to happen; for example a GET might load a page while a POST might cause a withdrawal transaction). The session ID cookie is the name of the cookie that the site will store a unique identifier for the user's session in. It is used so that the system can store information against the user's session. For example, the user ID can be stored which is needed when the transaction protector is communicating with the authentication engine. It will be recognized that this is but one example and that different data may also be employed if desired.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A gateway apparatus for providing security protection for online transactions between a first device and a second device comprising:
   a transaction protector, that includes one or more hardware processors in the gateway apparatus operative to intercept online transaction web page information flowing from the second device for the first device; to determine whether to inject transaction protection user interface data for the first device based on a risk assessment, in response to intercepting the online transaction web page information from the second device; and
   to provide transaction protection user interface data in addition to the online transaction web page information to the first device based on the determination wherein the injected transaction protection user interface data is comprised of graphic user interface script code for a web browser on the first device that when executed causes the first device to display at least one of a step-up authentication graphic user interface (GUI) and a transaction verification GUI.

2. The gateway apparatus of claim 1 wherein the transaction protector is operative to at least one of: verify the transaction for the second device and provide a step-up authentication of a user of the first device based on the injected transaction protection user interface data.

3. The gateway apparatus of claim 1 wherein the transaction protector is operative to inject the transaction protection user interface data with the web page information from the second device, and wherein the transaction protector is operative to block online transaction requests to the second device in response to unsuccessful verification of the transaction.

4. The gateway apparatus of claim 1 wherein the transaction protector is operative to provide a risk assessment of the online transaction concurrently with the online transaction independent of the second device and operative to determine whether an out of band verification process using a third device should be carried out for the online transaction based on the risk assessment of the online transaction.

5. The gateway apparatus of claim 1 comprising a configuration controller operative to provide a configuration user interface that comprises selectable online transaction verification risk rule data.

6. A gateway apparatus for communicating between a first device and a second device comprising:
   a transaction protector, that includes one or more hardware processors in the gateway apparatus operative to provide protection of an online transaction between the first device and the second device by determining whether to add protection for the second device based on a risk assessment of the online transaction and operative to selectively provide at least one of a step-up authentication operation and a transaction verification operation for the online transaction wherein the transaction verification operation employs a third device, based on the risk assessment; and
   wherein the transaction protector is operative to inject the transaction protection user interface data with the web page information from the second device wherein the injected transaction protection user interface data is comprised of graphic user interface script code for a web browser on the first device that when executed causes the first device to display at least one of a step-up authentication graphic user interface GUI and a transaction verification GUI, and wherein the transaction protector is operative to block online transaction requests to the second device in response to unsuccessful verification of the transaction.

7. The gateway apparatus of claim 6 wherein the transaction protector is operative to provide the risk assessment for the online transaction based on evaluating the online transaction web page information.

8. The gateway apparatus of claim 6 wherein the transaction protector is operative to initiate the transaction verification operation as an out of band transaction verification process.

9. The gateway apparatus of claim 6 wherein the transaction protector is operative to provide the risk assessment of the online transaction concurrently with the online transaction independent of the second device and operative to determine whether an out of band verification process using a third device should be carried out for the online transaction based on the risk assessment of the online transaction.

10. The gateway apparatus of claim 6 comprising a configuration controller operative to provide a configuration user interface that comprises selectable online transaction verification risk rule data.

11. An online transaction protection system comprising:
a web server operative to provide web page information for the online transaction;
a transaction protector gateway server that includes one or more hardware processors, in communication with the web server, operative to intercept online transaction web page information from the web server for a user device; operative to determine whether to inject transaction protection user interface data for the user device, in response to intercepting the online transaction web page information from the web server and operative to inject transaction protection user interface data in addition to the web page information to the user device based on the determination wherein the injected transaction protection user interface data is comprised of graphic user interface script code for a web browser on the first device that when executed causes the first device to display at least one of a step-up authentication graphic user interface (GUI) and a transaction verification GUI; and
a user device in communication with the transaction protector gateway server and operative to provide security information to facilitate the online transaction, in response to the injected transaction protection user interface data and web page information provided by the transaction protector gateway server.

12. The system of claim 11 wherein the transaction verification gateway server is operative to at least one of: verify the transaction for the web server and provide a step-up authentication of a user of the user device based on a risk assessment of the online transaction.

13. The system of claim 11 wherein the transaction verification gateway server is operative to inject the transaction protection user interface data with the web page information from the second device, and wherein the transaction protector is operative to block online transaction requests to the second device in response to unsuccessful verification of the transaction.

14. The system of claim 11 wherein the transaction verification gateway server is operative to provide a risk assessment of the online transaction concurrently with the online transaction independent of the second device and operative to determine whether an out of band verification process using a third device should be carried out for the online transaction based on the risk assessment of the online transaction.

15. The system of claim 11 wherein the transaction verification gateway server comprises a configuration controller operative to provide a configuration user interface that comprises selectable online transaction verification risk rule data.

16. A method, performed electronically by a gateway apparatus, for providing online transaction protection between a first device and a second device comprising:
intercepting, by the gateway apparatus, online transaction web page information flowing from the second device for the first device;
determining, by the gateway apparatus, whether to inject transaction protection user interface data for the first device, in response to intercepting the online transaction web page information, and
injecting, by the gateway apparatus, transaction protection user interface data in addition to the online transaction web page information to the first device based on the determination wherein the injected transaction protection user interface data is comprised of graphic user interface script code for a web browser on the first device that when executed causes the first device to display at least one of a step-up authentication GUI and a transaction verification GUI.

17. The method of claim 16 comprising providing a risk assessment for the online transaction based on evaluating the online transaction web page information and selectively providing at least one of: a step-up authentication operation and a transaction verification operation for the online transaction wherein the transaction verification operation employs a third device.

* * * * *